(12) United States Patent
Brennan

(10) Patent No.: US 6,344,635 B2
(45) Date of Patent: Feb. 5, 2002

(54) HYBRID METHOD FOR FIRING OF CERAMICS

(75) Inventor: John H. Brennan, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/817,393

(22) Filed: Mar. 26, 2001

Related U.S. Application Data

(63) Continuation-in-part of application No. 09/727,021, filed on Nov. 30, 2000, which is a continuation-in-part of application No. 09/473,741, filed on Dec. 28, 1999.

(51) Int. Cl.[7] .............................. H05B 6/64; H05B 6/68
(52) U.S. Cl. .......................... 219/681; 219/710; 34/248
(58) Field of Search ................................ 219/666, 681, 219/685, 686, 712, 759, 762, 779, 678; 34/248; 264/432, 434

(56) References Cited

U.S. PATENT DOCUMENTS

| | | |
|---|---|---|
| 3,585,258 A | 6/1971 | Levinson |
| 3,704,523 A | 12/1972 | Guerga et al. |
| 3,731,036 A | 5/1973 | Hallier et al. |
| 4,103,431 A | 8/1978 | Levinson |
| 4,292,262 A | 9/1981 | Tobin, Jr. |
| 4,307,277 A | 12/1981 | Maeda et al. |
| 4,771,153 A | 9/1988 | Fukushima et al. ......... 219/709 |
| 4,963,709 A | 10/1990 | Kimrey, Jr. ................. 219/686 |
| 5,227,600 A | 7/1993 | Blake et al. ................ 219/762 |
| 5,266,762 A | 11/1993 | Hoffman et al. ............ 219/779 |
| 5,365,043 A | 11/1994 | Bradford |
| 6,163,020 A | 12/2000 | Bartusch et al. |
| 6,172,346 B1 | 1/2001 | Wroe |

FOREIGN PATENT DOCUMENTS

EP  0 500 252  8/1992

(List continued on next page.)

OTHER PUBLICATIONS

"Microwave Sintering of Advanced Ceramics", Wroe and Samuels, pp. 39–51.

(List continued on next page.)

Primary Examiner—Tu Ba Hoang
(74) Attorney, Agent, or Firm—Timothy M. Schaeberle

(57) ABSTRACT

A method of firing ceramic materials involving placing the ceramic material in a microwave heating apparatus having a microwave cavity and subjecting the ceramic material to combination of microwave radiation and conventional heat energy according to predetermined time-temperature profile. The time-temperature profile, ranging from room temperature the sintering soak temperature, comprises a series of target heating rate temperature setpoints and a series of corresponding core and surface temperature setpoints with each of the core and surface temperature setpoints being offset from the target heating rate setpoints a predetermined offset temperature. In a preferred embodiment, the method involves continuously measuring the ceramic body core temperature, $T_C$, and the surface temperature $T_S$ and independently controlling the microwave power and the conventional heat in response to the core temperature value and the surface temperature value, respectively. Preferably, controlling of the microwave power involves adjusting the microwave power in response to a difference between core temperature setpoint and a biased core measured temperature, and controlling of the conventional heat involves adjusting the conventional heat in response to the difference between the surface temperature setpoint and a biased surface temperature.

32 Claims, 3 Drawing Sheets

FOREIGN PATENT DOCUMENTS

| | | |
|---|---|---|
| GB | 2 262 333 | 6/1993 |
| JP | 6-279127 | 10/1994 |
| WO | 88/04127 | 6/1988 |
| WO | 92/02150 | 2/1992 |
| WO | 93/12629 | 6/1993 |
| WO | 94/20209 | 9/1994 |
| WO | 95/05058 | 2/1995 |
| WO | 97/44170 | 11/1997 |
| WO | 97/44626 | 11/1997 |

OTHER PUBLICATIONS

"Scaling up the Microwave Firing of Ceramics", Wroe, *Microwaves II*, pp. 449–458.

"Microwave–assisted Firing of Ceramics", Wroe and Pearson.

"Microwave–assisted Firing of Ceramics", Wroe, Ch. 1—New Develop. & Applications, pp. 43–53.

"Dual Firing Drying of Ceramics", Maloney and Wroe, ZI 3/97, pp. 141–145.

"Keramischer Brand mit Mikrowellen–Unterstutzung", Wroe and Pearson, pp. D9–D11.

"Evidence of a non–thermal microwave effect in the sintering of partially stabilized zirconia", Wroe and Rowley, *Journal of Materials Science 31* (1996) 2019–2026.

"Microwave–assisted oxygenation of melt–processed bulk $YBa_2Cu_3O_{7-\delta}$ ceramics", Rowley, Wroe, Vazquez–Navarro, Lo, Cardwell, *Journal of Materials Science 32* (1997) 4541–4547.

"Improving Energy Efficiency in Firing of Ceramics", Wroe, Materials World, 8/93, pp. 446–448.

Effects of the time sequence of the cold rolling on the processing time of Ag–alloy sheathed $(Bi,Pb)2Sr2Ca2Cu3Ox$ tapes, M. penny et al, *Physica C 262* (1996) 63–67.

"Microwaves: Theory and Application in Materials Processing III", David E. Clark et al., *Ceramic Transactions*, vol. 59, Microwaves III, pp. 68–76.

HYBRID METHOD FOR FIRING OF CERAMICS

This application is a continuation-in-part of application Ser. No. 09/727,021, filed Nov. 30, 2000, which is a continuation-in-part of application Ser. No. 09/473,741, filed Dec. 28, 1999.

BACKGROUND OF THE INVENTION

1. Field of the Invention

The invention relates to method for manufacturing ceramic materials. In particular, this invention relates to a hybrid method for firing ceramics involving microwave and conventional radiative/convective heating, and more particularly to a method for efficiently controlling the heating rate by separately controlling the proportions of microwave and conventional radiative/convective energy.

2. Discussion of the Related Art

Conventional heating used in the manufacturing of ceramic materials typically comprises radiative gas or electric resistance heating. Utilization of conventional radiative/convective heating typically results in a thermal differential within the ceramic body. This differential is due, in part, to the fact that radiant heating is applied only to the surface and it relies on thermal conductivity of the ceramic body, typically poor, to effect the temperature beneath the surface and into the interior of the piece. In other words, conventional heating involves heat transfer that is predominantly achieved by radiation or convection to the surface followed by conduction from the surface into the interior of the ceramic body. If a core-surface thermal differential develops that is too great, internal cracking and distortion of the ceramic body can occur. Fast firing further exacerbates this problem of poor heat transfer, and ultimately cracking. Additionally, the presence of a core-surface thermal gradient can also result in uneven sintering, specifically surface sintering prior to, and at a faster rate than, interior sintering. As a result, the ceramic body may exhibit non-uniform properties. Undesirable solutions involve reducing the rate of heating or allowing lengthy holds at certain temperatures. Each of these undesirable solutions allows heat energy to be conducted into the core of the ceramic body, which in turn, allows the temperature of the core of the ceramic body to "catch up" with that of the surface, thereby minimizing the surface/core temperature differential. In summary, the theoretical limits of conventional radiative or convective heating typically result in slow heating rates for all ceramic bodies, the exception being ceramic bodies exhibiting small dimensions.

Microwave heating of ceramics has alternatively been successfully used to fire ceramic bodies. In comparison with conventional heating, microwave heating involves depositing energy directly within the ceramic body and involves a volumetric heating mechanism. Stated differently, the utilization of microwave energy involves delivering a uniform application of the energy to the entire cross section of the ceramic article, rather than to the article surface. Although microwave heating of ceramic bodies is much faster than conventional radiant heating because of this volumetric heating, it, like radiative heating, results in the ceramic body exhibiting a thermal differential; albeit an opposite thermal differential with the core of the ceramic body exhibiting a higher temperature than that of the surface. Specifically, as the ceramic materials, typically poor absorbers of microwave energy at low to intermediate temperatures, are heated with microwaves at high temperatures, the interior of the ceramic body very rapidly begins to absorb substantial amounts of microwave energy; this effect is known as thermal runaway. Although the surface is heated along with the core of the ceramic body, the surface rapidly loses much of its heat energy to the surroundings, typically cooler than the average ceramic material temperature. As the core starts to preferentially absorb the microwave energy this thermal runaway phenomenon becomes self-propagating. Simply stated, as the temperature of the ceramic body increases, the heat losses become greater, and the magnitude of the core-surface thermal differential increases, again leading to thermal stress within, and ultimately cracking of, the ceramic body.

In addition to heat losses from the surface of the ceramic body, non-uniformity of the microwaves within the kiln and non-uniform material properties of the ceramic leading to differential absorption of the microwave energy, contribute to this thermal differential due to microwave heating.

Hybrid microwave/conventional heating or microwave assisted heating has been proposed as an alternative to overcome the problems of conventional radiative and microwave-only heating. In microwave assisted heating involving both microwaves and radiative/convective heating, the volumetric heating provided by the microwaves heats the components, while the conventional heating radiative/convective provided by gas flame or electric resistance heating elements minimizes heat loss from the surface of the components by providing heat to the surface and its surroundings. This combination or hybrid heating can result in heating that avoids thermal profiles associated with conventional and microwave-only firing. As a result, thermal stresses are reduced and or minimized and thus the ceramic bodies can be heated more rapidly.

The conventional method of controlling these microwave assisted firing methods is disclosed in PCT Application WO 95/05058. This reference discloses a method of independently controlling the quantities of heat generated in the ceramic body by the microwave energy and radiant heat by measuring the ambient temperature within an enclosure containing the ceramic body. Based on, and in response to, this ambient temperature measurement, the heat generated in the ceramic body is controlled by one or both of the microwave energy or radiant heat. Although this control method is an improvement of the conventional control method, the mixing of kiln gases may not be uniform enough to accurately predict the ceramic body surface temperatures, thus reducing the effectiveness of the method. Further, many of the chemical reactions that occur within the ceramic body take place at temperatures low enough that radiant heat transfer is not a primary means of heat transfer from the ceramic body to the inside surfaces of the kiln where the kiln ambient temperatures are measured.

SUMMARY OF THE INVENTION

Accordingly it is an object of this invention to provide a method of, efficiently and effectively controlling the microwave and conventional radiative/convective energy utilized in the heating of ceramics that overcomes the shortcomings of the aforementioned hybrid microwave energy-conventional heating sintering of ceramics.

The firing method of present invention comprises placing the ceramic material in a microwave heating apparatus having a microwave cavity and subjecting the ceramic material to combination of microwave radiation and conventional heat energy according to a predetermined time-temperature profile. The time-temperature profile, ranging from room temperature to the sintering soak temperature, comprises a series of target heating rate temperature setpoints and corresponding core and surface temperature setpoints with each of the core and surface temperature setpoints being offset from the target heating rate setpoints by a predetermined offset temperature. The method involves continuously measuring the ceramic body core temperature, $T_C$, and the surface temperature $T_S$ and controlling the microwave power and the conventional heat in response to a core temperature value and a surface temperature value, respectively.

In a preferred embodiment the method involves controlling and adjusting the microwave power and the conventional heat in response to a biased core temperature value and a biased surface temperature value, respectively.

In a more preferred embodiment the controlling and the adjusting of the microwave power in response to a biased core temperature involves a biased core temperature value that is calculated as a difference between the core setpoint temperature and a biased core measured temperature, $T_{BC}$, the biased core measured temperature calculated according to the following formula, $T_{BC}=(xT_C+yT_S)/(x+y)$, wherein x is greater than y. Correspondingly the controlling and the adjusting of the conventional heat amount microwave power in response to a biased surface temperature value involves the utilization of a biased surface temperature value calculated as the amount of conventional heat is adjusted in response to the difference between the surface temperature setpoint and a biased surface temperature, $T_{BS}$, the biased surface measured temperature calculated according to the following formula, $T_{BS}=(xT_S+yT_C)/(x+y)$, wherein x is greater than y.

The method involves continuing to deliver and control the microwave power and the conventional heat at least until the ceramic body has reached it's sintering soak temperature.

DETAILED DESCRIPTION OF THE INVENTION

Figure 1:
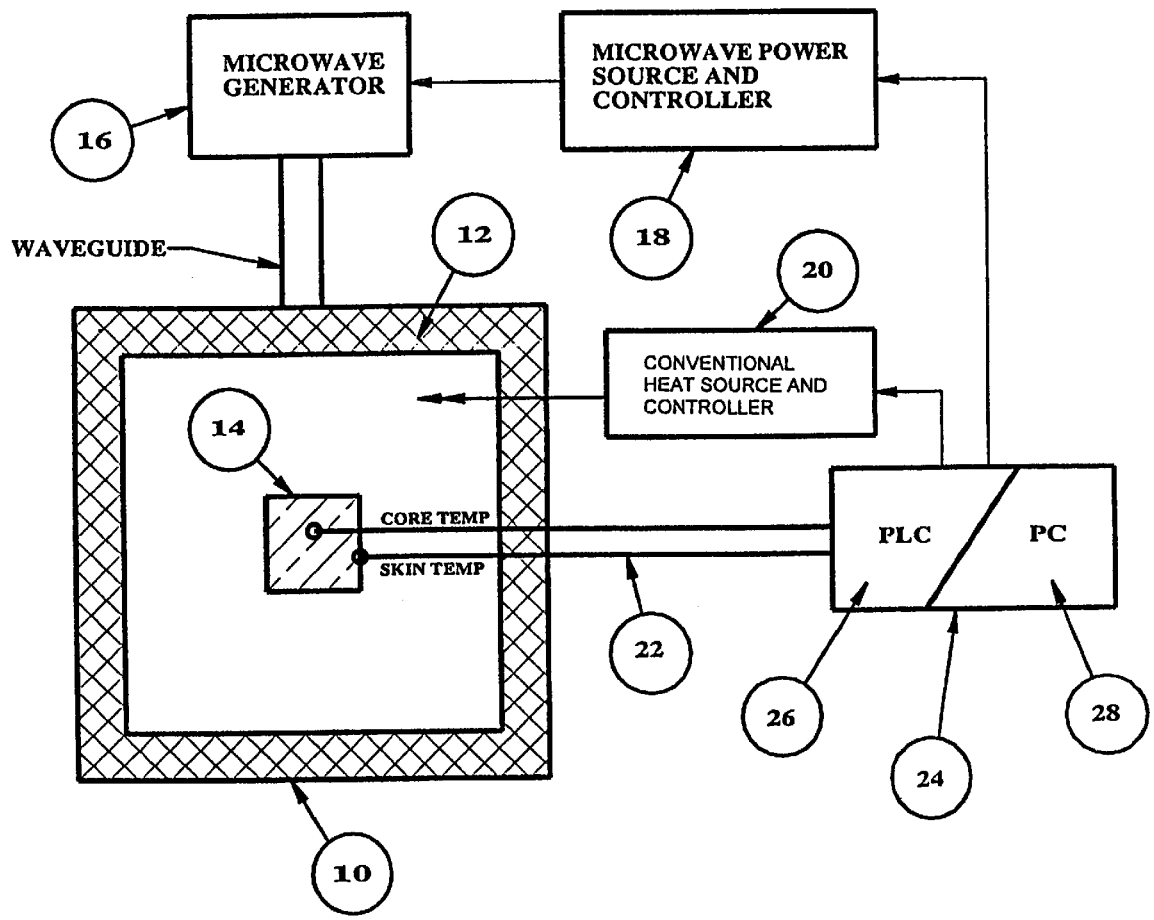
FIG. 1 is a block diagram of an apparatus illustrating the basic system for sintering a ceramic article according to the inventive heating method described herein.

Referring to FIG. 1, shown is a basic system for heating ceramic materials according to the method described herein. This system comprises a microwave resonant cavity 10, comprising a thermally insulated wall 12, within which is located a ceramic article 14 to be sintered. A microwave generator 16, for example a magnetron, is coupled directly or indirectly to the cavity 10; a waveguide is one means for coupling the microwave energy. The system includes a microwave power source/controller 18 for continuously adjusting the microwave power and an independently controlled conventional heat source/controller 21, configured to conventional heat within the thermally insulated enclosure 12 is shown. It is contemplated that the conventional heat source can comprise, convective or radiative heat, including, but not limited to, conventional electric resistance or gas heating in either a direct or indirect burner configuration.

The resonant cavity may be multimodal, namely it will support a large number of resonant modes in a given frequency range, and may include a mode stiffer to provide greater uniformity of electric field distribution within the microwave heating chamber.

The generator source employed to generate the microwaves can comprise any conventional magnetron with an adjustable power feature. Preferably, the frequency of incident microwave used should be between the range of about 915 MHz and 2.45 GHz, which is the designated industrial band in the United States. In other countries, wavelengths up to 10,000 MHz are known to be utilized. Furthermore, the power of the incident microwave need be no greater than that sufficient to raise the temperature of the ceramic article to a temperature effective for heating of the ceramic article. Specifically, the microwave generator should possess variable power levels ranging up to 75 kW.

A temperature measurement system 22 capable of measuring both the ceramic article's surface temperature and the temperature proximate the center of the ceramic article, i.e., the core temperature, is coupled to a control unit 24, that independently controls the microwave power source/controller 18 and the conventional heat source/controller 20. This control unit preferably comprises a combination of a programmable logic controller (PLC) 26 and a personal computer (PC 28). The temperature measurement system 22 comprises any appropriate temperature sensors (not shown) capable of measuring both surface and core temperature of the ceramic article. The term core as used throughout refers the interior portion of the ceramic article at or near the center of the particular ceramic article, however the core temperature can be measured at any position in the interior of the ceramic article to accurately reflects the temperature of the core. Suitable sensors include, for example, a pyrometer (or other thermographic device), a sheathed thermocouple, light pipe or black body probe. In a preferred embodiment the sensors comprise sheathed thermocouples comprised of a forwardly extending temperature probe in the form of a type S, or type B, thermocouple housed in a grounded platinum or other high temperature sheath.

In operation, the ceramic material is subjected to an amount of heat energy by irradiating it with a combination of electromagnetic microwave radiation and by subjecting the ceramic article to conventional heat. The amount of microwave radiation and conventional heat are such that the ceramic article is heated according to a predetermined time-temperature profile. The time-temperature profile, ranging from room temperature to the sintering soak temperature, is determined so as to heat the ceramic article to its sintering soak temperature in the minimum time while still allowing for the production of a ceramic article that, following the subsequent hold at the sintering soak temperature, exhibits the required characteristics of the ceramic material, specifically, a crack-free, undistorted ceramic article. It is contemplated that this control method can be optionally utilized during that subsequent firing period during which the temperature is held at the sintering soak temperature.

Specifically, the time temperature profile comprises a series of target heating rate temperature setpoints and corresponding core and surface temperature setpoints with each of the core and surface temperature setpoints being offset from the target heating rate setpoint by a predetermined offset temperature. It is contemplated that the target heating setpoints may form a straight line heating plot, a plot having several varying slopes or a curved heating plot, while the offset value may vary continuously or be maintained at a constant value.

The surface and core offset temperatures may be as far apart, temperature-wise, as to result in the maximum temperature differential that the ceramic article can withstand; i.e., an acceptable thermal differential between the surface and core temperatures. An acceptable thermal differential is one that results in a fired ceramic product that is substantially crack and distortion free. In other words, it is contemplated that the method of control is designed whereby the target heating rate setpoints and the corresponding offset core and surface setpoints are programmed into the PLC, so as to provide for the following condition—the core and surface setpoints are offset from the target heating setpoint a value such that the surface and the core temperatures maintained are within the acceptable thermal differential of the ceramic article to be sintered. The acceptable thermal differential varies from ceramic material to ceramic material and is a function of mechanical properties such as strength, shrinkage, Modulus of Elasticity et al., as well as the ceramic article shape. Furthermore, for a given material the acceptable thermal differential varies over different temperature ranges.

In a preferred embodiment this allowable thermal differential, assuming a cordierite material, is as low as 5° C. in the range of 475° C. to 600° C., where the modulus of elasticity, and modulus of rupture are minimal and the shrinkage curve indicates a steep shrinkage slope and as great as 25° C. during ranges of normal heating where there are no major firing events occurring (e.g., binder burnout). It should be noted that the acceptable thermal differential should take into account the general temperature uniformity within the kiln as a function of the ceramic article's location in the kiln. Burners, heating elements and other conventional energy sources may effect the overall temperature uniformity of the surface of the ceramic articles in the kiln in various locations. The application of microwave energy to the kiln induces a thermal difference in the interior of ceramic articles placed in different locations in the kiln. Although attempts to equally apply the energy sources effecting the surface and interior of the ceramic articles in different locations in the kiln (i.e. high velocity, pulse fired burners; multi-mode waveguides and stirrers), some non-uniformity must result and should be accounted for in the acceptable thermal differential programmed into the PLC.

Figure 2:
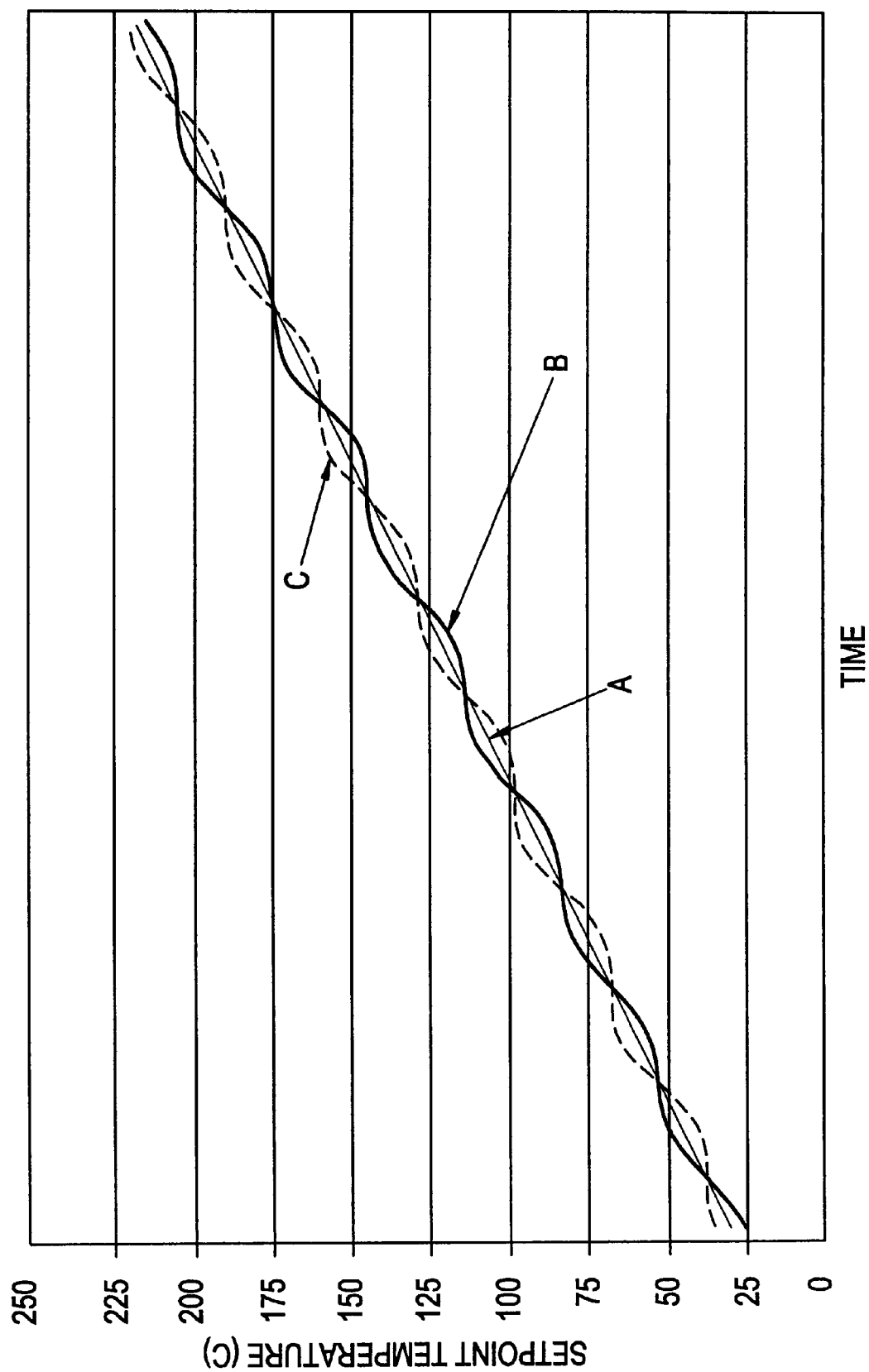
FIG. 2 is graph illustrating a time-temperature profile utilizing variable offset core and surface temperature setpoints according to the firing method described herein.

Referring to FIG. 2, illustrated is one embodiment of the time-temperature profile wherein the series of target heating setpoints form a straight line plot, A, and the corresponding core and surface setpoints are continuously varied and offset from the target heating temperature setpoint, so as to form corresponding and opposite sinusoidal curves, B and C respectively. Note that the two setpoint curves are 90° out of phase, although the method is not limited to this embodiment. Other wave forms are possible to create the cyclic thermal differential and are within the knowledge of those skilled in the art.

Figure 3:
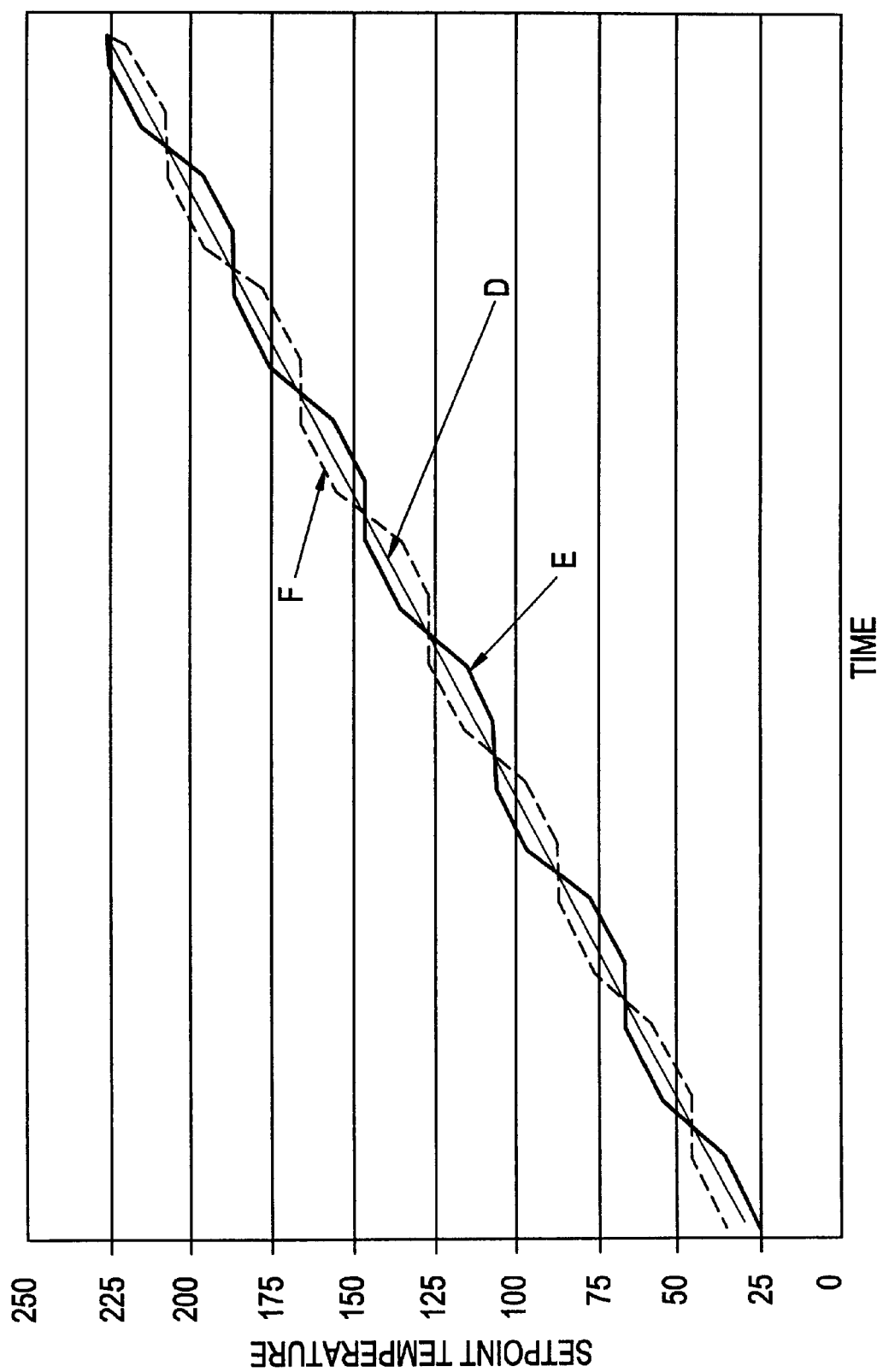
FIG. 3 is a graph illustrating a time-temperature profile utilizing stepwise offset and surface temperature setpoints according to the firing method described herein.

Referring to FIG. 3 illustrated is a second embodiment of the time-temperature profile wherein again the series of target heating setpoints form a straight line plot, D, however in this embodiment, the core and the surface setpoints are offset from the target setpoint in a stepwise manner, plots E and F, respectively. In other words, one of setpoints, either core or surface, is maintained for a period of time at a series of temperatures that are higher than, and offset a constant maximum value from, the corresponding target temperature setpoints. Correspondingly, the other setpoint is maintained at a series of temperatures that are lower than, and at a constant maximum offset temperature value from the corresponding target temperature setpoints. After the set period of time the situation is reversed and the previously lower temperature is maintained as the higher temperature while and the previously higher temperature is maintained as the lower temperature; both still offset from the corresponding target temperature setpoints at a constant maximum offset temperature value. Note that there is a brief period of transition time, during the aforementioned reversal of the high/low condition wherein the offset values vary from the corresponding target setpoint values, however once the preset maximum offset value is reached that value remains constant until the temperatures are reversed again.

It is contemplated that in both the wave and stepwise embodiments that the series of target, core and surface setpoints are constantly increasing until the ceramic article has reached is sintering temperature.

The benefit of utilizing the inventive control method, involving the offset setpoints is that the constant alternating of which of the two temperature setpoints, surface or core, is programmed to be the higher of the two temperature results, in a much better overall temperature uniformity. Based on conventional heat transfer theory, it is known that some temperature differential is necessary to drive the heat energy across the ceramic piece. The effectiveness of microwave energy application to the ceramic article, based in part on the material's loss factor, typically increases in ceramic materials as the temperature rises. Oscillation of the high temperature region in the ceramic article by the two energy sources allows for a slightly higher preferential heating by the microwave energy. By constantly moving the hotter region through the thickness of the ceramic article, the avoidance of a thermal runaway is realized. In other words, the purpose of these cyclic, target-core-surface temperature offsets is to encourage even heating throughout the thickness of the large ceramic article by "sweeping" the hotter interior zone created by the most dominant heat source back and forth between the deep interior (microwave dominant) and the surface (conventional dominant) of the ceramic article. In short, the net result of this produces a curve approximating the target heating setpoint curve with controllable temperatures that are uniform throughout the piece within acceptable thermal differentials.

In its broadest embodiment, the actual control of each of the two energy sources in this method of firing a ceramic body comprising involves independently controlling the quantities of heat generated in the ceramic body for both the microwave energy and the conventional heat. The controlling and adjusting of the microwave power is done so in response to a core temperature value and, while on the other hand the controlling and adjusting the conventional heat is done so in response to a surface temperature value.

In a more preferred embodiment, the method of control involves continuously measuring the ceramic body core temperature, $T_C$, and the surface temperature $T_S$. Each of the two energy sources are controlled through the utilization of a biasing component that is factored into the measured temperature of each of the surface and core. In other words, the controlling of the microwave power and the conventional heat comprises adjusting the microwave power in response to a biased core temperature value and adjusting the conventional heat in response to t a biased surface temperature value, respectively.

The biasing component of the measured core and surface temperatures minimizes the impact of the effect that each of the surface temperature and core temperature has on the measured value of the other.

The microwave power is controlled utilizing a biased core temperature as a first process value, $T_{BC}$, that is calculated according to the following formula, $T_{BC}=(xT_C+yT_S)/(x+y)$, with the value of x being greater than the value of y. The microwave power is adjusted in response to the difference between core temperature setpoint and biased core measured temperature, $T_{BC}$; if measured less than the setpoint, power is increased and vice versa. The biasing formula and the setpoint are programmed into the PLC and PC combination which function to compare the temperatures and thereafter send an output signal to adjust the microwave power.

The amount of conventional heat is controlled utilizing a biased surface temperature as a second process value, $T_{BS}$, that is calculated according to the following formula, $T_{BS}=(xT_S+yT_C)/(x+y)$, wherein the value of x is again greater than the value of y. The amount of conventional heat is adjusted in response to the difference between the biased surface temperature calculated, $T_{BS}$, and the surface temperature setpoint. If the biased measure surface temperature is less than the surface temperature setpoint, the conventional heat is increased and vice versa. As was the case for the microwave control, the biasing formula and the surface setpoint are programmed into the PLC and PC combination that function to adjust the conventional heat accordingly.

As stated above for both the surface and core biased measured temperatures the value of x should be greater than the value of y. Preferably the value of x is 2 while the value of y is one, however any values that satisfy the above requirement of x>y are contemplated. It is self evident that as the value of x increase with a constant value of y the biasing factor is decreased.

In commercial operation, continuous operation of the inventive method involving continuous control of the conventional heat utilizing the step of measuring both the temperature of the core of ceramic body and, as well as the surface temperature may not be practical. As such, the commercial embodiment of the method would simply involve placing the ceramic material in a microwave heating apparatus having a microwave cavity and subjecting the ceramic material to combination of microwave radiation and conventional heat energy according to predetermined time-temperature profile. As before, the time-temperature profile comprising a series of target heating rate temperature setpoints and a series of corresponding core and surface temperature setpoints with each of the core and surface temperature setpoints being offset from the target heating rate setpoints by a predetermined offset temperature.

Furthermore, the commercial embodiment would involve controlling the amount of microwave power and conventional heat in the same manner as described above, specifically, the utilization of a biasing component that is factored into the temperature of each of the surface and core. In particular, the controlling of the microwave power and the conventional would involve:

(a) adjusting the microwave power in response difference between the core temperature setpoint and a biased core temperature, $T_{BC}$, the biased core temperature calculated according to the following formula, $T_{BC}=(xT_C+yT_S)/(x+y)$, wherein x is greater than y;

(b) adjusting the amount of conventional heat in response to the difference between the surface temperature setpoint and a biased surface temperature, $T_{BS}$, the biased surface temperature calculated according to the following formula, $T_{BS}=(xT_S+yT_C)/(x+y)$, wherein x is greater than y.

It is within the knowledge of one skilled in the art to develop the acceptable target heating rate temperature setpoints and corresponding offset core and surface temperature setpoints necessary to fire the article to it sintering or soak temperature and optionally through it sintering or soak period within a reasonable amount of time. Factors including the ceramic composition, mechanical properties, geometry of the ceramic body, capabilities of the kiln should be considered in setting up the parameters of the firing process, and thus the target heating rate and corresponding, acceptable offset temperatures (i.e., thermal differential) sufficient to achieve a reasonable firing cycle that results in a sintered, crack and distortion-free ceramic article. For example, the firing cycle, including any sintering or soak period, for a cylindrical thin-wall ceramic body exhibiting a 7 in. length, a diameter of 3.866 in. and possessing a 2.0 mil cell well thickness and 900 cell/in$^2$ and comprising a predominantly cordierite phase involves subjecting the ceramic article to microwave radiation delivered at a power ranging between 35 and 60 kW, and frequency of 915 MHz in combination with the requisite amount of gas or electric in order to maintain the core-skin thermal equilibrium, for a period not to exceed 75 hours.

An additional feature of the invention is an optimization algorithm that can be programmed into the PLC that is capable of altering the predetermined target and core and surface setpoint temperatures, i.e., altering the overall heating rate. In one embodiment the predetermined setpoints can be increased (i.e., an increased firing rate) if one of the energy sources is at low control output level, while the other is well within control. In a second embodiment, the predetermined setpoints can be decreased (i.e., a slower heating rate) if one of the energy sources is at a high control output level while the other is well within control. For example, during organic binder removal (burnout), the interior of the piece may increase in temperature with little or no microwave energy input (<15%) necessary to maintain the core at its predetermined setpoint, while the conventional energy source is controlling to a reasonable output, e.g., 40%. Increasing the predetermined target heating setpoints and the corresponding core and surface temperature setpoints, i.e., increasing the heating rate, would force the conventional energy to increase to some higher control output limit, e.g., 80%. This likely would cause the microwave power to increase slightly. This method could be thought of as "chasing the exotherm", and is based on the premise that burning organics produce internal heat (an exothermic reaction) that will allow the surface to be heated faster than the original target heating setpoint dictated.

Conversely, during endothermic reactions, such as chemically bound water removal steps, the interior temperature of the ceramic article may drop, even though a high level (>85%) of microwave energy is applied to maintain the temperature of the core at its predetermined setpoint. Altering the target heating ramp rate to a slower heating rate, i.e. a decrease in the temperature setpoints of the target and the corresponding the core and the surface, would lower the microwave power to a controllable output while minimizing the thermal differences within the piece.

This optimization algorithm is beneficial in two ways: (1) the firing cycle can be reduce to the shortest practical time; (2) the energy sources are maintained at levels such that neither operates at the extremes of output, thereby increasing the life of heating components. One skilled in the art should define to the control system the minimum and maximum control output "trigger points", where the algorithm begins to modify the target, core and surface heating setpoints if the control of one of the energy sources falls outside these trigger points.

Detailed in TABLE I is a typical target heating rate and an acceptable thermal differential, from which the corresponding offset core and surface setpoint temperatures can be determined, for firing a cordierite ceramic material to its sintering soak temperature (1400° C.); specifically a kiln having a microwave power range listed above and approximately 1 m³ load space, loaded with 450 lbs. extruded cellular bodies: Note that the profile comprises a series of separate firing periods or segments, for firing a cordierite ceramic body to its sintering soak temperature (1400° C.). In operation, the PLC will perform the following functions during the heating of the of the ceramic body: (1) calculate the target temperature setpoints and corresponding surface and core temperature setpoints; (2) adjusting the microwave power to maintain core temperature of the ceramic article at the core temperature setpoint at any given time. (2) adjusting the conventional power to maintain a surface temperature of the ceramic article at the surface temperature setpoint at any given time. (3) optionally, monitoring the microwave and conventional energy source outputs, making adjustments to the target heating rate (i.e., increase or decrease in the preset target temperature setpoints) if preset power output limit trigger points have been reached.

TABLE I

| Segment | Starting Temp. | Ending Temp. | Target Time (minutes) | Event | Acceptable Thermal Differential (C.) |
|---|---|---|---|---|---|
| 1 | 30 | 225 | 85 | Normal Heating | 25 |
| 2 | 225 | 435 | 91 | Binder Burnout | 15 |
| 3 | 435 | 600 | 72 | Chem. Bound Water Loss | 10 |
| 4 | 600 | 825 | 88 | Normal Heating | 25 |
| 5 | 850 | 1000 | 76 | Chem. Bound Water Loss | 10 |
| 6 | 1000 | 1225 | 148 | Normal Heating | 25 |
| 7 | 1225 | 1400 | 300 | Property Formation | 10 |
| 8 | 1400 | 1400 | 240 | Thermal Soak | 5 |

The method described herein is particularly suitable for use in the firing thinwall cellular ceramic bodies as well as thick cross section ceramic articles. Firing as used herein refers to a process of heating a ceramic article to a temperature to densify (sinter) a given ceramic and/or to complete the conversion into the desired crystalline phase.

It should be understood that while the present invention has been described in detail with respect to certain illustrative and specific embodiments thereof, it should not be considered limited to such. For instance, although the inventive control method is described in terms of microwaves, it is contemplated that this method of control is suitable for use with other high frequency waves, e.g., millimeter waves. It is contemplated that numerous modifications are possible without departing from the broad spirit and scope of the present invention as defined in the appended claims.

I claim:

1. A method for firing a ceramic material comprising:
   placing the ceramic material in a microwave heating apparatus having a microwave cavity and subjecting the ceramic material to combination of microwave radiation and conventional heat energy according to predetermined time-temperature profile, the time-temperature profile comprising a series of target heating rate temperature setpoints and a series of corresponding core and surface core temperature setpoints with each of the core and surface temperature setpoints being offset from the target heating rate setpoints by a predetermined offset temperature;
   continuously measuring the ceramic body core temperature, $T_C$, and the surface temperature $T_S$ and controlling and adjusting the microwave power in response to the core temperature and controlling and adjusting the conventional heat in response to the surface temperature.

2. The method of claim 1 wherein controlling the microwave power and conventional heat comprise adjusting the microwave power in response to a biased core temperature value and adjusting the conventional heat in response to a biased surface temperature value, respectively.

3. The method of claim 1 wherein controlling the microwave power and conventional heat comprise:
   a) adjusting the microwave power in response to a biased core temperature value, wherein the biased core temperature value is calculated as the difference between the core temperature setpoint and a biased core measured temperature, $T_{BC}$, the biased core measured temperature calculated according to the following formula, $T_{BC}=(xT_C+yT_S)/(x+y)$, wherein x is greater than y;
   b) adjusting the amount of conventional heat in response to a biased surface temperature value wherein the biased surface temperature value is calculated as the difference between the surface temperature setpoint and a biased surface temperature, $T_{BS}$, the biased surface measured temperature calculated according to the following formula, $T_{BS}=(xT_S+yT_C)/(x+y)$, wherein x is greater than y;
   continuing to deliver and control the microwave power and the conventional heat until the ceramic body has at least reached is sintering soak temperature.

4. The method of claim 1 wherein the core and surface temperature setpoints are offset from the target heating rate temperature setpoints by a varying temperature value whereby each of the surface and core temperature setpoints are continuously varied and form a sinusoidal curve from room temperature to the sintering soak temperature.

5. The method of claim 1 wherein the core and surface temperature setpoints are offset from the target heating rate temperature setpoints by a constant temperature value whereby each of the surface and core temperature setpoints form a step change plot from room temperature to the sintering soak temperature.

6. The method of claim 3 wherein the value of x is 2 and the value of y is 1.

7. The method of claim 1 wherein the frequency of microwave energy to which the ceramic article is subject to ranges between about 915 MHz to about 2.45 GHz.

8. The method of claim 1 wherein the maximum power to which the ceramic article is subject to is greater than about 1 kW but less than about 75 kW.

9. The method of claim 1 wherein the delivery and control the microwave power and the conventional heat continues throughout a sintering soak period until the ceramic body is completely sintered.

10. The method of claim 1 wherein the conventional heating comprises convective or radiative heat including, conventional electric resistance or gas heating in either a direct or indirect burner configuration.

11. A method of firing a ceramic body comprising independently controlling the quantities of heat generated in the ceramic body by the microwave energy and the conventional heat, the controlling of the conventional heat and the microwave power comprising measuring the temperature of the core and the surface of the ceramic body and controlling and adjusting the microwave power in response to the core temperature and controlling and adjusting the conventional heat in response to the surface temperature.

12. The method of firing a ceramic body according to claim 11 wherein controlling the microwave power and conventional heat comprise adjusting the microwave power in response to a biased core temperature value and adjusting the conventional heat in response to a biased surface temperature value, respectively.

13. The method of firing a ceramic body according to claim 12 wherein controlling the microwave power and conventional heat comprise:
   a) adjusting the microwave power in response to a biased core temperature value wherein the biased core temperature value is calculated as the difference between a preset core temperature setpoint and a biased core temperature, $T_{BC}$, the biased core measured temperature calculated according to the following formula, $T_{BC}=(xT_C+yT_S)/(x+y)$, wherein x is greater than y; and,
   b) adjusting the conventional heat output in response to a biased surface temperature value wherein the biased surface temperature value is calculated as the difference between a preset surface temperature setpoint and a biased surface temperature, $T_{BS}$, the biased surface measured temperature calculated according to the following formula, $T_{BS}=(xT_S+yT_C)/(x+y)$, wherein x is greater than y.

14. A method in accordance with claim 11 wherein the value of x is 2 and the value of y is 1.

15. The method of claim 11 wherein the conventional heating comprises convective or radiative heat including, conventional electric resistance or gas heating in either a direct or indirect burner configuration.

16. A method for firing a ceramic material comprising:
   placing the ceramic material in a microwave heating apparatus having a microwave cavity and subjecting the ceramic material to combination of microwave radiation and conventional heat energy according to predetermined time-temperature profile, the time-temperature profile comprising a series of target heating rate temperature setpoints and a series of corresponding core and surface core temperature setpoints with each of the core and surface temperature setpoints being offset from the target heating rate setpoints by a predetermined offset temperature.

17. The method of claim 16 wherein the core and surface temperatures are continuously measured and the controlling of the microwave power and the conventional heat involve adjusting the microwave power in response to the temperature of the core temperature and adjusting the conventional heat in response to the surface temperature.

18. The method of claim 17 wherein the controlling the microwave power and the conventional heat comprises adjusting the microwave power in response to a biased core temperature value and adjusting the conventional heat in response to a biased surface temperature value, respectively.

19. The method of claim 16 wherein the controlling the microwave power and the conventional heat comprises:
   (a) adjusting the microwave power in response to a biased core temperature value wherein the biased core temperature value is calculated as the difference between the core temperature setpoint and a biased core temperature, $T_{BC}$, the biased core temperature calculated according to the following formula, $T_{BC}=(xT_C+yT_S)/(x+y)$, wherein x is greater than y;
   (b) adjusting the amount of conventional heat in response to a biased surface temperature value wherein the biased surface temperature value is calculated to the difference between the surface temperature setpoint and a biased surface temperature, $T_{BS}$, the biased surface temperature calculated according to the following formula, $T_{BS}=(xT_S+yT_C)/(x+y)$, wherein x is greater than y.

20. The method according to claim 16 involving continuing to deliver and control the microwave power and the conventional heat until the ceramic body has at least reached is sintering soak temperature.

21. The method of claim 16 wherein the core and surface temperature setpoints are offset from the target temperature setpoints by a varying temperature value whereby each of the surface and core temperature setpoints are continuously varied and form a sinusoidal curve from room temperature to the sintering soak temperature.

22. The method of claim 16 wherein the core and surface temperature setpoints are offset from the target temperature setpoints by a constant temperature value whereby each of the surface and core temperature setpoints form a step change plot from room temperature to the sintering soak temperature.

23. The method of claim 16 wherein the value of x is 2 and the value of y is 1.

24. The method of claim 16 wherein the frequency of microwave energy to which the ceramic article is subject to ranges between about 915 MHz to about 2.45 GHz.

25. The method of claim 16 wherein the maximum power to which the ceramic article is subject to is greater than about 1 kW but less than about 75 kW.

26. The method of claim 16 wherein the delivery and control the microwave power and the conventional heat continues throughout a sintering soak period until the ceramic body is completely sintered.

27. The method of claim 16 wherein the conventional heating comprises convective or radiative heat including, conventional electric resistance or gas heating in either a direct or indirect burner configuration.

28. A method of firing a ceramic body comprising independently controlling the quantities of heat generated in the ceramic body by the microwave energy and the conventional heat, the controlling of the conventional heat and the microwave power comprising controlling and adjusting the microwave power in response to a core temperature value and controlling and adjusting the conventional heat in response to a surface temperature value.

29. The method of firing a ceramic body according to claim 28 wherein controlling the microwave power and conventional heat comprise measuring the core temperature and surface temperature adjusting the microwave power in response to a biased core temperature value and adjusting the conventional heat in response to a biased surface temperature value, respectively.

30. The method of firing a ceramic body according to claim 29 wherein controlling the microwave power and conventional heat comprise:
   c) adjusting the microwave power in response to a biased core temperature value wherein the biased core temperature value is calculated as the difference between a preset core temperature setpoint and a biased core temperature, $T_{BC}$, the biased core measured temperature calculated according to the following formula, $T_{BC}=(xT_C+yT_S)/(x+y)$, wherein x is greater than y; and,
   d) adjusting the conventional heat output in response to a biased surface temperature value wherein the biased surface temperature value is calculated as the difference between a preset surface temperature setpoint and a biased surface temperature, $T_{BS}$, the biased surface measured temperature calculated according to the following formula, $T_{BS}=(xT_S+yT_C)/(x+y)$, wherein x is greater than y.

31. A method in accordance with claim 30 wherein the value of x is 2 and the value of y is 1.

32. The method of claim 28 wherein the conventional heating comprises convective or radiative heat including, conventional electric resistance or gas heating in either a direct or indirect burner configuration.

* * * * *